United States Patent
Yamamoto (10) Patent No.: US 9,914,472 B2
(45) Date of Patent: Mar. 13, 2018

(54) MOTOR CONTROLLER AND ELECTRIC POWER STEERING DEVICE USING SAME

(71) Applicant: DENSO CORPORATION, Kariya, Aichi-pref. (JP)

(72) Inventor: Toshihisa Yamamoto, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 42 days.

(21) Appl. No.: 15/217,803

(22) Filed: Jul. 22, 2016

(65) Prior Publication Data

US 2017/0029014 A1 Feb. 2, 2017

(30) Foreign Application Priority Data

Jul. 27, 2015 (JP) .................. 2015-147747

(51) Int. Cl.
| | |
|---|---|
| H02H 7/09 | (2006.01) |
| B62D 5/04 | (2006.01) |
| F02N 11/00 | (2006.01) |
| H02P 29/024 | (2016.01) |
| H02P 29/032 | (2016.01) |
| H02P 27/06 | (2006.01) |

(52) U.S. Cl.
CPC .............. B62D 5/046 (2013.01); B62D 5/04 (2013.01); F02N 11/003 (2013.01); H02P 29/024 (2013.01); H02P 29/032 (2016.02); H02P 27/06 (2013.01)

(58) Field of Classification Search
USPC .................... 318/400.22, 139, 400.04, 400.3
See application file for complete search history.

(56) References Cited

U.S. PATENT DOCUMENTS

| | | | |
|---|---|---|---|
| 9,728,359 B1* | 8/2017 | Katrak | H01H 47/002 |
| 2007/0080844 A1* | 4/2007 | Terazawa | H03M 1/0636 |
| | | | 341/155 |
| 2011/0149425 A1* | 6/2011 | Hatagami | G11B 5/09 |
| | | | 360/46 |
| 2011/0316510 A1* | 12/2011 | Oshima | H05B 33/0815 |
| | | | 323/282 |

(Continued)

FOREIGN PATENT DOCUMENTS

| | | |
|---|---|---|
| JP | H6-350450 A | 12/1994 |
| JP | H8-162952 | 6/1996 |
| JP | 2010-064056 A | 3/2010 |

*Primary Examiner* — Jorge L Carrasquillo
(74) *Attorney, Agent, or Firm* — Knobbe, Martens, Olson & Bear, LLP (57) ABSTRACT

A motor controller includes, in a microcomputer, a voltage fall determiner determining whether a reference voltage falls from a normal value based on an Analog-to-Digital (A/D) conversion value of a second voltage from an A/D converter, and a corrector (i) calculating a correction coefficient based on the A/D conversion value of the second voltage from the A/D converter and (ii) correcting an A/D conversion value of an input voltage that is output from the A/D converter. A core of the microcomputer generates a control signal based on an input voltage A/D conversion value, when the voltage fall determiner determines that the reference voltage is equal to or higher than a normal reference value. The motor controller keeps its motor control accuracy in such manner, even when a fall of an A/D conversion reference voltage is observed.

6 Claims, 6 Drawing Sheets

(56) References Cited

U.S. PATENT DOCUMENTS

2014/0001815 A1* 1/2014 Tanaka ................. H02P 7/0094
　　　　　　　　　　　　　　　　　　　　　　　297/463.1
2015/0251690 A1* 9/2015 Yamamoto ........... B62D 5/0484
　　　　　　　　　　　　　　　　　　　　　　　318/400.21

* cited by examiner

MOTOR CONTROLLER AND ELECTRIC POWER STEERING DEVICE USING SAME

CROSS REFERENCE TO RELATED APPLICATION

The present application is based on and claims the benefit of priority of Japanese Patent Application No. 2015-147747, filed on Jul. 27, 2015, the disclosure of which is incorporated herein by reference.

TECHNICAL FIELD

The present disclosure generally relates to a motor controller for controlling a rotating electric machine and an electric power steering device using such a motor controller.

BACKGROUND INFORMATION

Conventionally, in the art of motor control, signals from various sensors in a vehicle are converted from Analog to Digital (A/D) conversion, and the A/D converted voltage is inputted to a controller for controlling various in-vehicle devices.

For example, a voltage of an external power source, which corresponds to a battery voltage, is A/D-converted, and, based on an A/D conversion value, a final injection time of a fuel injection valve is determined by a control device in a patent document, JP H06-350450 A (patent document 1).

In general, when a reference voltage at the time of A/D conversion is lower than the normal value, an A/D conversion may be falsely performed, i.e., may not yield an accurate A/D conversion result.

In the control device of the patent document 1, the regulator generates two internal power source voltages (i.e., 5 V, 2.5 V), of high and low, from the battery voltage, for switchingly using one of the two voltages as a reference voltage at the time of A/D conversion depending on operational situations.

In the control device of the patent document 1, when performing the A/D conversion of a voltage that is not in a proportional relationship with the internal power source voltage, e.g., a battery voltage, a heater current voltage, etc., it is first determined whether the battery voltage is higher than a predetermined voltage value (5 V), and, upon determining that the battery voltage is higher than the predetermined voltage value, the A/D conversion is performed by using the higher one of the two reference values (5 V).

On the other hand, when it is determined that the battery voltage is lower than the predetermined voltage value, the A/D conversion is performed by using the lower one of the two the reference voltages (2.5 V).

Thereby, even when the external power source voltage falls, the A/D conversion of the voltage corresponding to the battery voltage, the heater current voltage, etc. is accurately performable.

However, in the control device of the patent document 1, when the battery voltage is lower than the predetermined voltage value (e.g., a voltage between 2.5 V and 5 V), the A/D conversion is performed with a lower reference voltage (i.e., 2.5 V) that is lower than a usual reference voltage (i.e., 5 V), the Signal-to-Noise (S/N) ratio gets worse and may possibly lead to an inaccurate A/D conversion.

Therefore, while the battery voltage falls to a lower-than-normal value (e.g., 2.5 to 5 V) relative to the predetermined voltage value, various in-vehicle devices may not be highly or accurately controllable by the control device of the patent document 1. Further, when the battery voltage is equal to or lower than the lower reference voltage (2.5 V) or the like, the reference voltage falls to be lower than the normal value (2.5 V), and the A/D conversion may not be accurately performable.

Further, in case that the control device of the patent document 1 is applied to, for example, a control of an electric power steering device of an idle stop vehicle, when an engine restarts after the idol stop, the battery voltage may fall to be equal to or lower than the predetermined voltage value by the rotation of the starter motor, and the control of the electric power steering device may not be performable with high accuracy.

SUMMARY

It is an object of the present disclosure to provide a motor controller that is capable of accurately controlling a rotating electric machine, even when a reference voltage for an A/D conversion is lowered, and providing an electric power steering device using such a motor controller.

The present disclosure describes a motor controller that controls a rotating electric machine, and the motor controller is provided with a first regulator, a second regulator, and a microcomputer.

The first regulator converts an external power source voltage of an external power source to a first voltage that is a preset voltage lower than the external power source voltage and outputting the first voltage. The second regulator converts the external power source voltage of the external power source to a second voltage that is a preset voltage lower than the first voltage and outputting the second voltage.

The microcomputer includes a peripheral and a core for controlling the rotating electric machine by outputting a control signal to the rotating electric machine via the peripheral. The peripheral (a) operates on the first voltage from the first regulator, and (b) receives (i) an input voltage from the external power source and (ii) the second voltage.

The core (c) operates on the second voltage from the second regulator and (d) generates the control signal.

The peripheral further includes an Analog-to-Digital (A/D) converter that performs an A/D conversion for the input voltage and for the second voltage, with reference to the first voltage that serves as a reference voltage, and outputs an input voltage A/D conversion value that is a result value of A/D conversion of the input voltage, and a second voltage A/D conversion value that is a result value of A/D conversion of the second voltage.

The core further includes a voltage fall determiner determining whether the reference voltage is lower than a normal reference value that is a value of the reference voltage at a normal operation time, based on the second voltage A/D conversion value, and a corrector calculating a correction coefficient based on the second voltage A/D conversion value, and correcting the input voltage A/D conversion value based on the correction coefficient.

The control signal is generated based on the input voltage A/D conversion value, when the voltage fall determiner determines that the reference value is equal to or higher than the normal reference value. Also, the control signal is generated based on a correction result value that is calculated by correcting the input voltage A/D conversion value by the corrector, when the voltage fall determiner determines that the reference value is lower than the normal reference value.

Thus, while the reference voltage is not lower than the normal value, based only on the result value of A/D conversion of the input voltage, the control signal is generated and the rotating electric machine is controlled in a control scheme of the present disclosure. In such case, since the A/D converter performs the A/D conversion by using the first voltage that is higher than the second voltage as the reference voltage, the S/N ratio of a signal is high, the input voltage is A/D-converted with high accuracy, and the rotating electric machine is controllable with high accuracy.

On the other hand, when the reference voltage is lower than the normal value, the input voltage A/D conversion value, which is an A/D conversion result value of the input voltage by the A/D converter, may include an error.

Therefore, in the present disclosure, when the reference voltage is lower than the normal value, the corrector corrects the input voltage A/D conversion value, the control signal is generated based on the correction result value, i.e., a result value of correction by the corrector, and the rotating electric machine is controlled by such a control signal.

Here, the corrector calculates the correction coefficient based on the second voltage A/D conversion value, which is a result value of the A/D conversion of the second voltage by the A/D converter, and corrects the input voltage A/D conversion value based on the correction coefficient. The correction coefficient is changed according to a degree of the fall of the reference voltage from the normal value.

Therefore, the corrector can correct the input voltage A/D conversion value according to the fall of the reference voltage. Therefore, even when the reference voltage is lower than the normal value, the rotating electric machine is controlled with high accuracy.

Thus, the control scheme of the present disclosure enables a control of the rotating electric machine with high accuracy, irrespective of the fall of the reference voltage that is used for the A/D conversion.

Note that, in the present disclosure, the core operates on the second voltage that is lower than the first voltage, thereby the operation of the core is guaranteed, unless the external power source voltage greatly falls down to or around the second voltage.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the control device and the electric power steering device by the embodiment of the present disclosure are described based on the drawings.

One Embodiment

Figure 1:
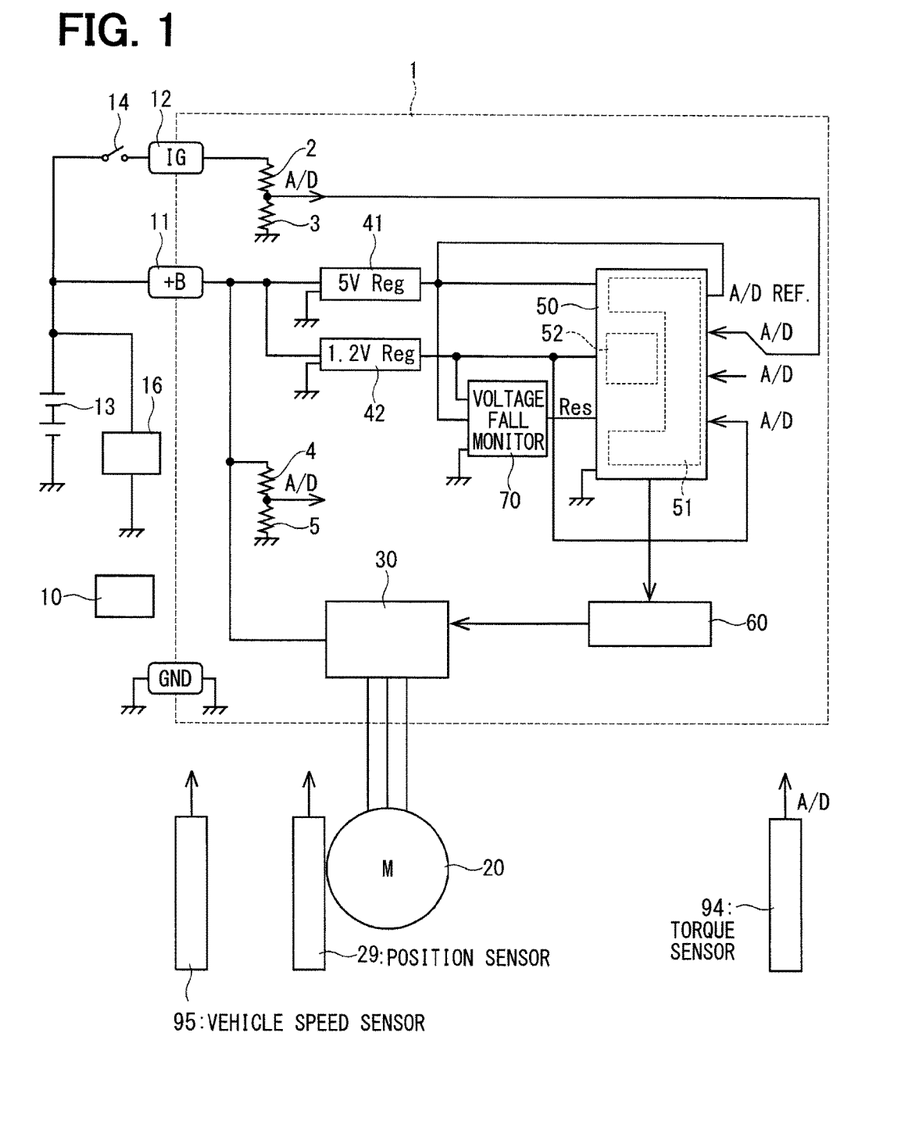
FIG. 1 is an illustration diagram of a control device in one embodiment of the present disclosure.

As shown in FIG. 1, an Electronic Power Steering-Electronic Control Unit (EPS-ECU) 1 as a control device, i.e., a motor controller, in one embodiment of the present disclosure performs a drive control of a motor 20 that serves as a rotating electric machine.

The EPS-ECU 1 is adopted as an electric power steering (EPS) device for assisting a steering operation of a vehicle together with the motor 20, for example. That is, the EPS-ECU 1 is an electronic control unit for an electric power steering device.

Figure 2:
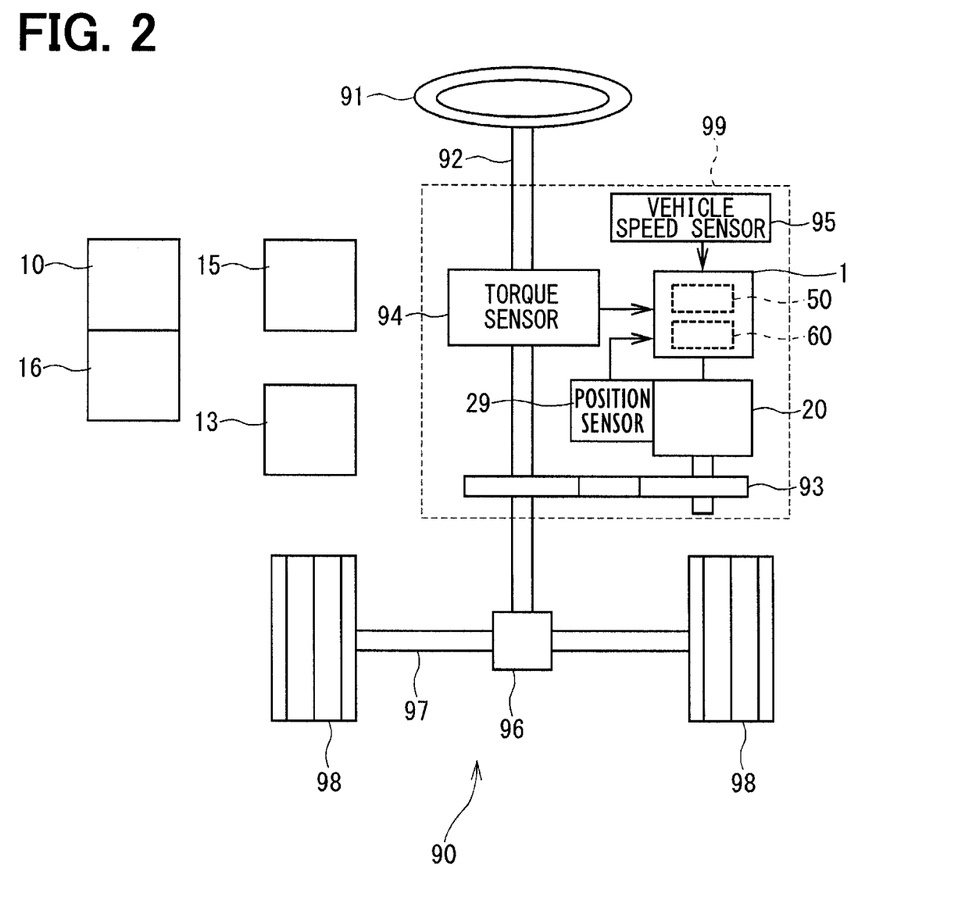
FIG. 2 is a schematic diagram of an electric power steering device to which the control device in the one embodiment of the present disclosure is applied.

FIG. 2 shows an entire configuration of a steering system 90 provided with an electric power steering device 99. In the electric power steering device 99, a torque sensor 94 is disposed on a steering shaft 92 that is connected to a steering wheel 91. The torque sensor 94 detects a steering torque that is inputted from a driver to the steering shaft 92 via a steering wheel 91.

A pinion gear 96 is disposed at a tip of the steering shaft 92, and the pinion gear 96 engages with a rack shaft 97. A pair of wheels 98 is connected with both ends of the rack shaft 97 in a rotatable manner via a tie rod etc.

When the driver rotates the steering wheel 91, the steering shaft 92 connected to the steering wheel 91 rotates, and the rotational movement of the steering shaft 92 is turned into the translational movement of the rack shaft 97 by the pinion gear 96, and the pair of wheels 98 is steered by an angle according to displacement of the rack shaft 97 by the translational movement.

The electric power steering device 99 is provided with the EPS-ECU 1 which performs a drive control of the motor 20, the motor 20 that generates a steering assist torque, and a speed reduction gear 93 which reduces the speed of rotation of the motor 20 and transmits the rotation to the steering shaft 92, together with other components. The motor 20 rotates the speed reduction gear 93 reciprocally, i.e., forward and backward. The electric power steering device 99 includes, as mentioned above, the torque sensor 94 and a vehicle speed sensor 95 which detects a travel speed of the vehicle.

In such a configuration, the electric power steering device 99 generates the steering assist torque for assisting the steering operation of the steering wheel 91 from the motor 20, and transmits the torque to the steering shaft 92. Thus, in the present embodiment, the electric power steering device 99 is a column-assist type electric power steering device.

In the present embodiment, the motor 20 is a three-phase brushless motor, and has a rotor and a stator which are not illustrated. The rotor is a disc-like member, which has a permanent magnet stuck on the surface of the disc, and has magnetic poles.

The stator accommodates the rotor in an inside thereof, while supporting the rotor in a rotatable manner. The stator has a projection part that projects at every predetermined angle in an inward direction, and three winding wire are wound around the projection part.

The three winding wires respectively correspond to a U phase, a V phase, and a W phase.

A position sensor 29 that detects a rotation position of the motor 20 (i.e., the rotor) is disposed in the motor 20.

The motor 20 rotates with a supply of the electric power from a battery power source 11. The battery power source 11 is electrically connected to the high potential side (i.e., a positive side) of a battery 13 that serves as an external power source disposed in a vehicle. Therefore, the electric power of the external power source voltage, which is a predetermined voltage, is supplied to the battery power source 11 from the battery 13. In the present embodiment, the external power source voltage is about 12 V at the normal operation time.

The EPS-ECU 1 is provided with an inverter 30 as a power converter, a first regulator 41, a second regulator 42, a microcomputer 50, a driver 60, and a voltage fall monitor 70 or the like as shown in FIG. 1.

The inverter 30 is a three-phase inverter and switches the power supply to each of three winding wires of the motor 20 by a bridge connection of the six switching elements. Here, the switching elements of the inverter 30 are a Metal-Oxide Semiconductor Field-Effect Transistor (MOSFET), which is a kind of a field effect transistor, for example.

The six switching elements of the inverter 30 constitute three pairs of switching elements, each pair having two of the elements. The three pairs of switching elements have, respectively, a high side switching element and a low side switching element, with one of three winding wires interconnected among each other. The high side switching element in each of the three pairs is connectable to the battery power source 11. High side and low side in the above context are, more practically, a high potential side and a low potential side.

When the six switching elements of the inverter 30 perform the switching operation, the electric power from the battery power source 11 is converted, and is supplied to the three winding wires. Thereby, the motor 20 is rotated.

In such manner, the inverter 30 converts the electric power from the battery power source 11, and supplies the converted electric power to the motor 20.

In the present embodiment, the EPS-ECU 1 has resistors 2, 3, 4, and 5.

One end of the resistor 2 is electrically connected to an ignition power source 12. One end of the resistor 3 is connected to the other end of the resistor 2, and the other end of the resistor 3 is connected to the ground (i.e., a low voltage side of the battery 13, or a negative side).

The ignition power source 12 is electrically connected to the high potential side (i.e., a positive side) of the battery 13. An ignition switch 14 is disposed between the battery 13 and the ignition power source 12. In an ON state, the ignition switch 14 allows a flow of the electric power between the battery 13 and the ignition power source 12, and, in an OFF state, the ignition switch 14 interrupt a flow of the electric power between the battery 13 and the ignition power source 12. Therefore, when the ignition switch 14 is in the ON state, the electric power of the external power source voltage of about 12 V, which is the predetermined voltage, is supplied to the ignition power source 12 from the battery 13.

The resistor 2 and the resistor 3 constitute a voltage division circuit. Therefore, a divided voltage, which is a division of the voltage of the ignition power source 12, is taken out from a junction point between the resistor 2 and the resistor 3. Here, in the present embodiment, the resistance of the resistors 2 and 3 is respectively set to a certain value that controls a divided voltage to be lower than 5 V. More specifically, the resistance of the resistors 2 and 3 is set to a value that controls a divided voltage to 1/4.8 times of the voltage of the ignition power source 12. Therefore, when the voltage of the ignition power source 12 is 12 V, the divided voltage divided by the resistor 2 and the resistor 3 is set to 2.5 V.

One end of the resistor 4 is connected to a junction point between the battery power source 11 and the inverter 30. One end of the resistor 5 is connected to the one end of the resistor 4, and the other end of the resistor 5 is connected to the ground. The resistor 4 and the resistor 5 constitute a voltage division circuit.

Therefore, a divided voltage, which is a division of the voltage currently applied to the inverter 30, is taken out from a junction point between the resistor 4 and the resistor 5. Here, in the present embodiment, the resistance of the resistors 4 and 5 is respectively set to a certain value that controls a divided voltage to be lower than 5 V.

One end of the first regulator 41 is connected to the battery power source 11. The first regulator 41 outputs a converted voltage from the other end, which is a predetermined voltage lower than the external power source voltage of about 12 V, as a first voltage.

In the present embodiment, at the normal operation time, i.e., when the external power source voltage is about 12 V, the first regulator 41 outputs a voltage of about 5 V in a stable manner as the first voltage.

On the other hand, when the external power source voltage falls from 12 V down to about 6 V, for example, the first voltage outputted from the first regulator 41 may become lower than 5 V.

One end of the second regulator 42 is connected to the battery power source 11. The second regulator 42 outputs a converted voltage from the other end, which is a predetermined voltage lower than the first voltage (i.e., 5 V), as a second voltage.

In the present embodiment, at the normal operation time, i.e., when the external power source voltage is about 12 V, the second regulator 42 outputs a voltage of about 1.2 V in a stable manner as the second voltage.

Figure 3:
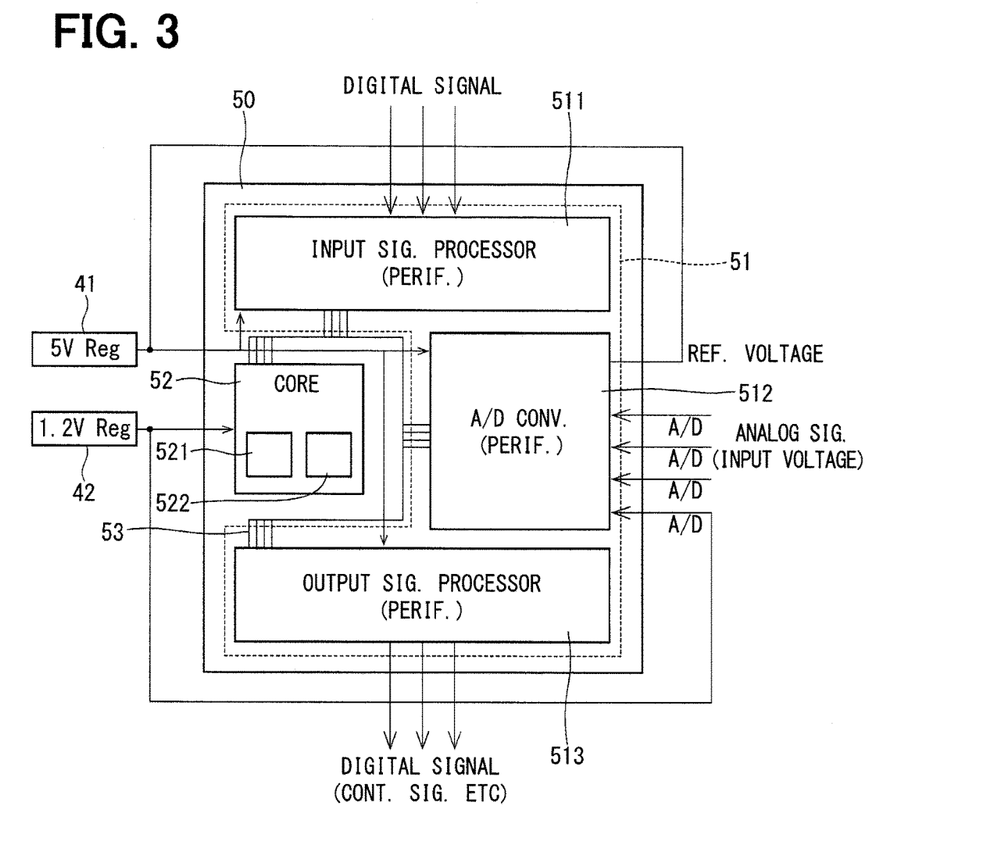
FIG. 3 is an illustration diagram of a microcomputer of the control device in the one embodiment of the present disclosure.

As shown in FIG. 3, the microcomputer 50 is a semiconductor package (i.e., one-chip microcomputer) which has a peripheral 51, a core 52, Read-Only Memory (ROM), Random Access Memory (RAM) (not shown), etc.

The microcomputer 50 performs a calculation according to the program stored in ROM, generates a control signal, and controls the motor 20 via the inverter 30, based on various signals from the position sensor 29, the torque sensor 94, the vehicle speed sensor 95 and the like, as well as the voltage taken out from the junction point between the resistor 2 and the resistor 3 (i.e., the divided voltage which is divided from a voltage of the ignition power source 12) and the voltage taken out from the junction point between the resistor 4 and the resistor 5 (i.e., the divided voltage which is divided from a voltage that is applied to the inverter 30).

Here, in the present embodiment, an analog signal (i.e., an analog voltage) is taken out, i.e., is output, from the torque sensor 94, from the junction point between the resistor 2 and the resistor 3, from the junction point between the resistor 4 and the resistor 5, and the analog signal is inputted to the microcomputer 50.

On the other hand, a digital signal is output from the position sensor 29 and the vehicle speed sensor 95, and the digital signal is inputted to the microcomputer 50.

The peripheral 51 is a periphery device that is a built-in part in the microcomputer 50, for processing a signal inputted from an outside of the microcomputer 50 or processing a signal outputted to an outside of the microcomputer 50.

In the present embodiment, the peripheral 51 operates on the first voltage (i.e., 5 V at the normal operation time) outputted from the first regulator 41, and receives an input of the voltage (i.e., the analog signal, the digital signal) from an outside (i.e., from the torque sensor 94, from the junction point between the resistor 2 and the resistor 3, from the junction point between the resistor 4 and the resistor 5, from the position sensor 29, from the vehicle speed sensor 95 or the like). Note that, in the present embodiment, the peripheral 51 may be operable on a voltage of 3.3 to 5 V, for example.

The core 52 is an operation part, or a processor, in the microcomputer 50, and performs the operation/calculation based on the signal (i.e., the digital signal) inputted via the peripheral 51, and outputs the calculation result via the peripheral 51.

In the present embodiment, the core 52 operates on the second voltage (i.e., 1.2V at the normal operation time) outputted from the second regulator 42, and generates the control signal for controlling the motor 20. Note that, in the present embodiment, the core 52 may be operable on a voltage equal to or greater than 1.2V, for example.

The microcomputer 50 generates the control signal with the core 52, outputs the control signal to the motor 20 via the peripheral 51, and controls the motor 20.

As shown in FIG. 3, the peripheral 51 has an input signal processor 511, an Analog/Digital (A/D) converter 512, and an output signal processor 513.

The digital signal is inputted to the input signal processor 511 from the position sensor 29 and the vehicle speed sensor 95. The input signal processor 511 outputs the inputted digital signal to the core 52 via a bus (i.e., connector) 53.

The input voltage (i.e., an analog signal), which is a voltage inputted from the outside (i.e., from the torque sensor 94, from the junction point between the resistor 2 and the resistor 3 and from the junction point between the resistor 4 and the resistor 5) is inputted to the A/D converter 512.

The first voltage of about 5 V (i.e., an analog signal) outputted from the first regulator 41, and the second voltage of about 1.2V (i.e., an analog signal) outputted from the second regulator 42, are inputted to the A/D converter 512.

The A/D converter 512 performs the A/D conversion of the input voltage (i.e., an analog signal) inputted from the outside and the second voltage (i.e., an analog signal) inputted from the second regulator 42, by using the first voltage of about 5 V that is inputted from the first regulator 41 as a reference voltage.

The A/D converter 512 performs the A/D conversion of the input voltage inputted from the outside, and outputs an input voltage A/D conversion value which is a result value of the A/D conversion of the input voltage to the core 52 via the bus 53.

Further, the A/D converter 512 performs the A/D conversion of the second voltage, and outputs a second voltage A/D conversion value which is a result value of the A/D conversion of the second voltage to the core 52 via the bus 53.

The core 52 has a voltage fall determiner 521 and a corrector 522 that are implemented as, for example, software function blocks.

The voltage fall determiner 521 determines whether the reference voltage is lower than the normal value of about 5 V, which is a value at the normal operation time, based on the second voltage A/D conversion value from the A/D converter 512.

The corrector 522 calculates a correction coefficient based on the second voltage A/D conversion value from the A/D converter 512, and corrects the input voltage A/D conversion value from the A/D converter 512, based on the correction coefficient.

In the present embodiment, the core 52 generates the control signal based on the input voltage A/D conversion value from the A/D converter 512, when it is determined that the reference voltage is not lower than the normal value by the voltage fall determiner 521.

On the other hand, the core 52 generates the control signal based on a correction result value, which is calculated by correcting the input voltage A/D conversion value from the A/D converter 512 by the corrector 522, when it is determined that the reference voltage is lower than the normal value, by the voltage fall determiner 521.

The core 52 outputs the generated control signal to the driver 60 via the bus 53 and the output signal processor 513.

Now, the second voltage A/D conversion value when the reference voltage is not lower than the normal value of about 5 V is designated as Vf, the second voltage A/D conversion value at a time of determination by the voltage fall determiner 512 is designated as Vr, and a determination value calculated as a ratio Vf/Vr is designated as j. Also, a value between 0 and 1 is designated as $\alpha$ (i.e., $0 \leq \alpha < 1$). Further, the voltage fall determiner 521 determines:

at the time of $j \geq 1-\alpha$, that the reference voltage is not lower than the normal value; and at the time of $j < 1-\alpha$, that the reference voltage is lower than the normal value.

Here, when $\alpha$ is set to a value between 0 and 1, a blind sector is set up in the determination. In the present embodiment, $\alpha$ may be set to a value 0.01, for example.

The second voltage A/D conversion value Vf, when the reference voltage is not lower than the normal value of about 5 V, corresponds to a result value of the A/D conversion of the second voltage (1.2 V) when the reference voltage is 5 V. Therefore, Vf may be memorized in advance to ROM of the microcomputer 50, etc.

Further, when the correction coefficient is designated as k, the corrector 522 calculates k as k=Vf/Vr, and corrects the input voltage A/D conversion value by multiplying the input voltage A/D conversion value with the correction coefficient k, for obtaining a correction result value.

Based on the control signal from the microcomputer 50, the driver 60 applies an instruction signal to the gate of the switching element of the inverter 30, and operates each of the switching elements. That is, the microcomputer 50 is capable of controlling an operation of the inverter 30 via the driver 60.

Thus, the microcomputer 50 is capable of controlling the motor 20 by operating on the first voltage from the first regulator 41 and the second voltage from the second regulator 42, and by controlling the operation of the inverter 30.

The voltage fall monitor 70 is connected to a position between the first regulator 41 and the peripheral 51, to a position between the second regulator 42 and the core 52, and to the microcomputer 50.

The voltage fall monitor 70 receives an input of the first voltage outputted from the first regulator 41, and an input of the second voltage outputted from the second regulator 42.

The voltage fall monitor 70 monitors whether the inputted first voltage to be equal to or lower than a first preset voltage that is a predetermined voltage.

The voltage fall monitor 70 also monitors whether the inputted second voltage to be equal to or lower than a second preset voltage that is a predetermined voltage.

In the present embodiment, the first preset voltage is set to 3.3 V, and the second preset voltage is set to 1.2 V.

Upon determining that the inputted first voltage is equal to or lower than the first preset voltage, or upon determining that the inputted second voltage is equal to or lower than the second preset voltage, the voltage fall monitor 70 outputs a reset signal (i.e., Res) to the microcomputer 50. The microcomputer 50 is reset (i.e., performs a reboot) when the reset signal is inputted to the microcomputer 50.

As shown in FIG. 1, a starter 16 is connected to the battery 13 in the present embodiment. The starter 16 is an electric motor driven by the electric power from the battery 13, and is capable of outputting a torque which starts an operation of an engine 10 that is an internal-combustion engine for driving the wheel 98.

As shown in FIG. 2, a vehicle in the present embodiment is provided with an electronic control unit (henceforth "ECU") 15. The ECU 15 is a small computer which has Central Processing Unit (CPU), ROM, RAM, Input/Output (I/O), etc. The ECU 15 operates according to a program stored in ROM based on information from various sensors etc. in each part of the vehicle, and controls the vehicle in an integrated manner by controlling the engine 10, the in-vehicle devices, and other apparatuses, etc. in the vehicle.

The ECU 15 may serve as an operation stop section, and stops an operation of the engine 10, when stop conditions which are the conditions of stopping the operation of the engine 10 are satisfied.

Here, as "stop conditions", a situation, in which a predetermined time has lapsed after a deceleration of a vehicle by an application of breaking by a driver of a vehicle and having a vehicle speed of 0, may be considered. In such a situation, the operation stop section may serve as a so-called idle stop section.

Further, the ECU 15 may serve as an operation start section, and starts an operation of the engine 10, when start conditions which are the conditions of starting the operation of the engine 10 are satisfied.

Here, as "start conditions", a situation, in which an amount of application of breaking by the drive of the vehicle decreases to be equal to or lower than a preset value, may be considered.

The ECU 15 starts the operation of the engine 10 by driving the starter 16 (refer to FIG. 1) and cranking the engine 10, when the start conditions are satisfied.

Figure 4:
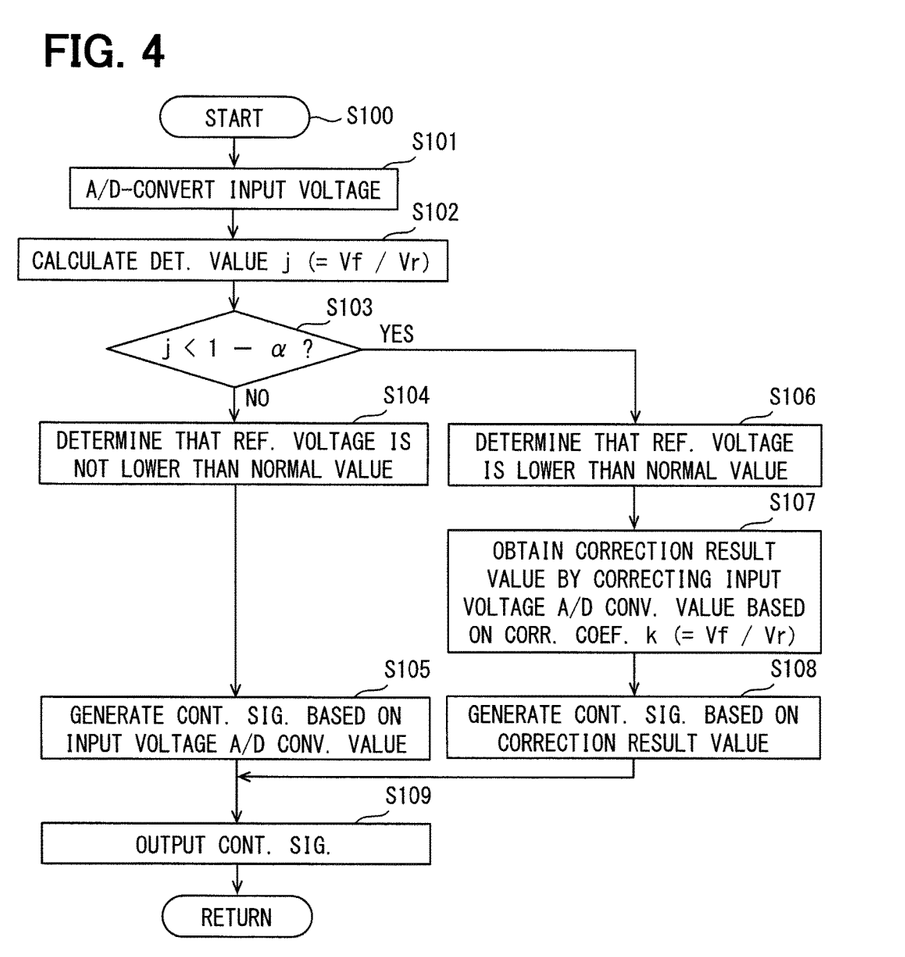
FIG. 4 is a flowchart of a process of generating a control signal by the microcomputer of the control device in the one embodiment of the present disclosure.

Next, a series of processes about generation of the control signal with the microcomputer 50 is described based on FIG. 4.

The microcomputer 50 performs a series of processes S100 shown in FIG. 4, when controlling the motor 20.

The entire process S100 is started when no abnormality is observed after the ignition switch 14 of the vehicle is turned ON and preprocesses such as an abnormality determination are performed, and S100 is repeated until the ignition switch 14 is turned OFF.

In S101, the A/D converter 512 converts, i.e., performs an A/D conversion to, an input voltage from an outside (i.e., from the torque sensor 94, from the junction point between the resistor 2 and the resistor 3, from the junction point between the resistor 4 and the resistor 5) and the second voltage by using the first voltage as a reference voltage, and outputs the input voltage A/D conversion value and the second voltage A/D conversion value to the core 52. Then, the process proceeds to S102 after S101.

In S102, the core 52 calculates the determination value j (=Vf/Vr) based on (i) the second voltage A/D conversion value Vf (i.e., a predetermined value) when the reference voltage is not lower than the normal value, and (ii) the second voltage A/D conversion value Vr from the A/D converter 512. Then, the process proceeds to S103 after S102.

In S103, the core 52 determines whether "j<1−α" is true or not. When it is determined that "j<1−α" is true (S103: YES), the process proceeds to S106. On the other hand, when "j<1−α" is not true, i.e., when it is determined that "j≥1−α" (S103: NO), the process proceeds to S104.

In S104, the core 52 determines whether the reference voltage is not lower than the normal value. Then, the process proceeds to S105.

In S105, the core 52 generates the control signal based on the input voltage A/D conversion value that is outputted from the A/D converter 512 in S101. Then, the process proceeds to S109.

In S106, the core 52 determines whether the reference voltage is lower than the normal value. Then, the process proceeds to S107.

In S107, the core 52 corrects the input voltage A/D conversion value outputted from the A/D converter 512 in S101 based on the correction coefficient k (=Vf/Vr), and obtains a correction result value. More specifically, the core 52 corrects the input voltage A/D conversion value by multiplying the input voltage A/D conversion value from the A/D converter 512 by the correction coefficient k. Here, as the correction coefficient k, the determination value j (=Vf/Vr) calculated in S102 may be utilized. Then, the process proceeds to S108 after S107.

In S108, the core 52 generates the control signal based on the correction result value obtained in S107. Then, the process proceeds to S109.

In S109, the core 52 outputs the control signal generated in S105 or S108 to the driver 60. The driver 60 applies the instruction signal to the switching elements of the inverter 30 based on the control signal from the core 52. Thereby, an operation of the motor 20 is controlled. After S109, the process escapes from a series of processes S100, to return to a parent process, for example.

The operation of the motor 20 is controlled by repeatedly executing the above-mentioned S100 during an ON period of the ignition switch 14.

The core 52 serves as the voltage fall determiner 521 in S102, S103, S104, and S106. Further, the core 52 serves as the corrector 522 in S107.

Next, an example of the operation of the EPS-ECU 1 and the ECU 15 is described.

When a driver of the vehicle turns the ignition switch 14 to ON, a supply of the electric power from the battery 13 is provided for the ignition power source 12. Thereby, the voltage from the junction point between the resistor 2 and the resistor 3 (i.e., a divided voltage of a voltage from the ignition power source 12) is inputted to the microcomputer 50.

Then, the microcomputer 50 performs the pre-processes, such as the abnormality determination and the like. When no abnormality is observed in such preprocesses, the microcomputer 50 controls the rotation of the motor 10 by controlling the inverter 30, based on the signals from the position sensor 29, the torque sensor 94, the vehicle speed sensor 95 or the like, as well as the voltage from the junction point between the resistor 2 and the resistor 3 (i.e., the divided voltage of a voltage from the ignition power source 12), and the voltage from the junction point between the resistor 4 and the resistor 5 (i.e., the divided voltage of the voltage currently applied to the inverter 30). Thereby, a steering operation of the vehicle by the driver is assisted by the electric power steering device 99.

Figure 5:
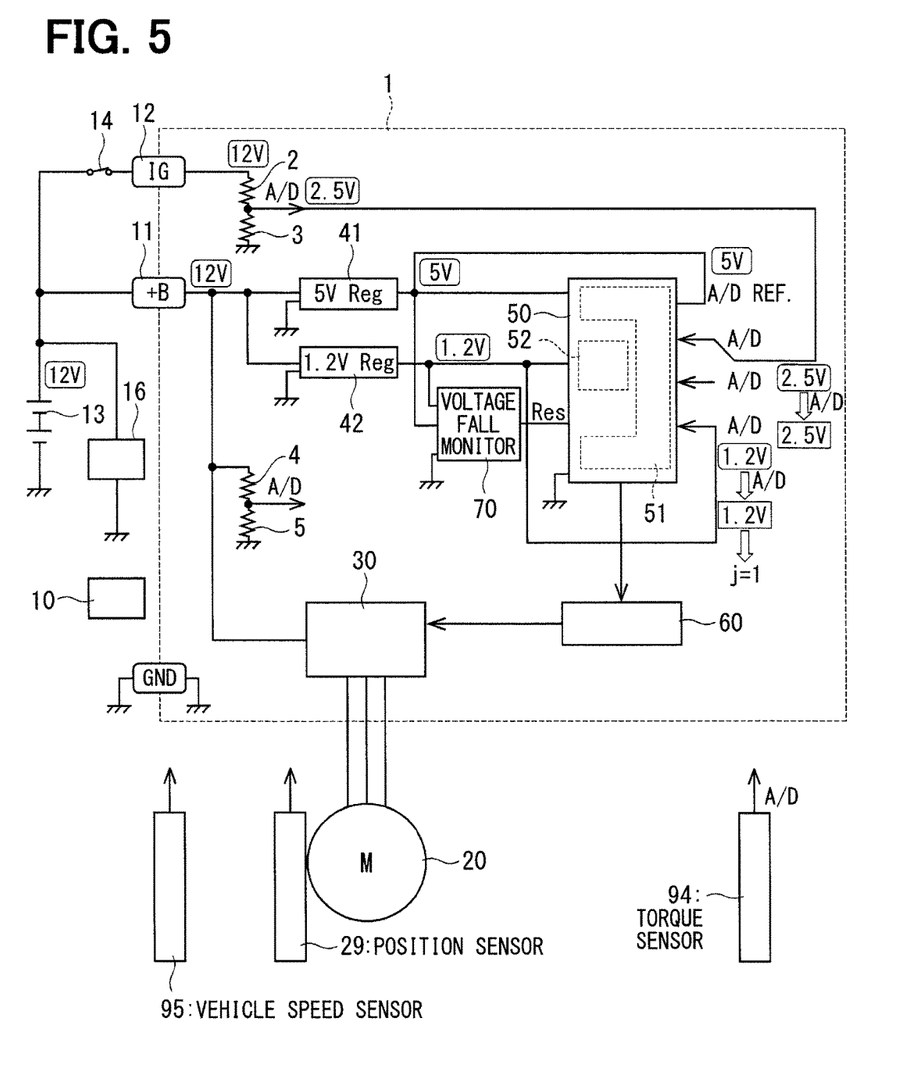
FIG. 5 is an illustration diagram of the control device in the one embodiment of the present disclosure in which a voltage of an external power source is a normal value.

As shown in FIG. 5, when the voltage of the battery 13, i.e., the external power source voltage, is 12 V (i.e., at the normal operation time), the first voltage of 5 V is output from the first regulator 41, and is inputted to the microcomputer 50. Therefore, in such case, the microcomputer 50 performs the A/D conversion by using a reference value of 5 V (i.e., a normal value). When the A/D conversion of the second voltage (1.2 V) outputted from the second regulator 42 is performed with the reference voltage of 5 V, the second voltage A/D conversion value (Vr) is calculated as a value corresponding to 1.2 V. In such case, the determination value j (i.e., Vf/Vr=1.2/1.2) is equal to 1, which leads to j≥1−α (e.g., α=0.01), the microcomputer 50 determines that the reference voltage is not lower than the normal value of 5 V.

Note that, when the voltage of the battery 13 is 12 V, the voltage of 12 V is output from the ignition power source 12, thereby the divided voltage of the voltage from the ignition power source 12 divided by the resistor 2 and the resistor 3 is set to 2.5 V. Now, when the voltage (2.5 V) of the ignition power source 12 divided by the resistor 2 and the resistor 3 is converted by the A/D conversion with the reference voltage (5 V), the input voltage A/D conversion value is set to a value corresponding to 2.5 V, and matches with the divided voltage (2.5 V) of the ignition power source 12 after the voltage division process. Thus, the microcomputer 50 can detect that the voltage of the ignition power source 12 is 12 V by multiplying the input voltage A/D conversion value (2.5 V) by 4.8 times.

Therefore, the A/D conversion of the input voltage is accurately performed, when it is determined that the reference voltage is not lower than the normal value of 5 V (i.e., when the reference voltage is normal), and the motor 20 is controlled based only on the result value from the A/D conversion of the input voltage.

The ECU 15 stops the engine 10, when the stop conditions of the engine 10 are satisfied (i.e., the idol stop). Then, when the start of operation conditions of the engine 10 are satisfied, the ECU 15 drives the starter 16 and starts the operation of the engine 10. At such moment, the voltage of the battery 13 may fall to be equal to or lower than the predetermined value.

Figure 6:
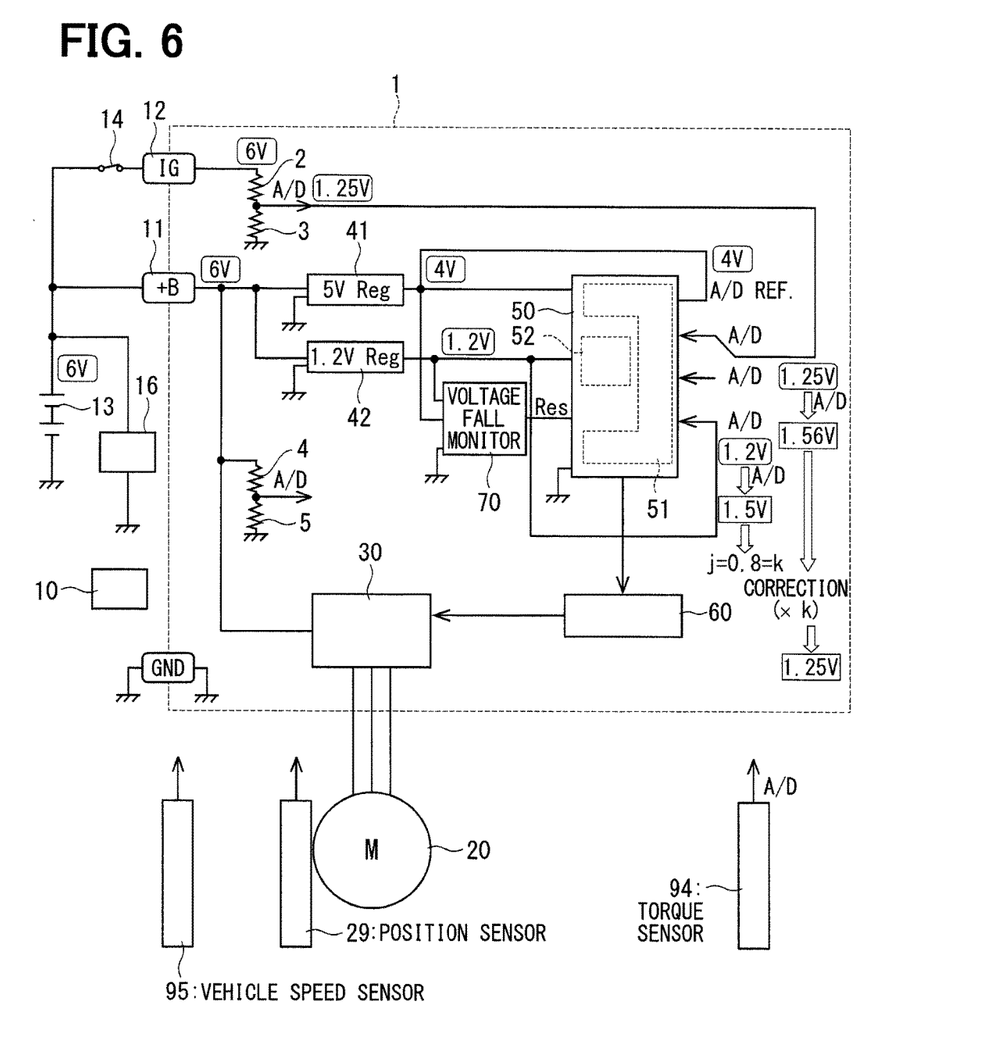
FIG. 6 is an illustration diagram of the control device in the one embodiment of the present disclosure, in which the voltage of the external power source is lower than the normal value.

For example, as shown in FIG. 6, when the voltage of the battery 13, i.e., the external power source voltage, falls down to 6 V (i.e., at the time of the battery voltage fall), an input voltage to the first regulator 41 is 6 V that is 1 V higher than 5 V. Therefore, the first regulator 41 cannot output the first voltage of 5 V, i.e., the first voltage output from the first regulators 41 may be 4 V, for example. Thus, the microcomputer 50 performs the A/D conversion by using the reference voltage of 4 V in such a situation.

In this case, the second regulator 42 receives an input of the voltage 6 V, which is 4.8 V higher than 1.2 V, the second regulator 42 outputs the second voltage of 1.2 V. When the second voltage of 1.2 V outputted from the second regulator 42 is converted by the A/D conversion with the reference voltage (4V), the second voltage A/D conversion value (Vr) is set to the value corresponding to 1.5 V.

Thus, the determination value j (i.e., Vf/Vr=1.2/1.5) is equal to 0.8, and j<1−α (e.g., α=0.01) is true, leading to a determination by the microcomputer 50 that the reference voltage is lower than the normal value of 5 V.

Further, when the voltage of the battery 13 falls down to 6V, the voltage of the ignition power source 12 divided by the resistor 2 and the resistor 3 is set to 1.25V, because the voltage of 6 V is output from the ignition switches 12.

In such case, when the voltage (1.25 V) of the ignition power source 12 divided by the resistor 2 and the resistor 3 is converted by the A/D conversion with the reference voltage (4 V), the input voltage A/D conversion value is set to a value corresponding to 1.56 V, and does not match with the voltage (1.25 V) of the ignition power source 12 after the voltage division process.

Since, in this case, the microcomputer 50 has already determined that the reference voltage is lower than the normal value of 5 V, the correction result value is obtained as a value corresponding to 1.25 V by multiplying the input voltage A/D conversion value (1.56 V) by the correction coefficient k (i.e., Vf/Vr=0.8). Then, the microcomputer 50 can detect that the voltage of the ignition power source 12 is 6 V by multiplying the correction result value (1.25 V) by 4.8 times.

Thus, when it is determined that the reference voltage is lower than the normal value of 5 V (i.e., when the reference voltage is lower than the normal time), the A/D conversion of the input voltage cannot be accurately performed, and the motor 20 is controlled based on the correction result value, which is calculated by correcting the input voltage A/D conversion value with the correction coefficient k.

In addition, the voltage fall monitor 70 monitors whether the first voltage outputted from the first regulator 41 is equal to or lower than the first preset voltage (3.3 V), and monitors whether the second voltage outputted from the second regulator 42 is equal to or lower than the second preset voltage (1.2 V), and, when the voltage fall monitor 70 determines that the first voltage is equal to or lower than the first preset voltage (3.3 V), or that the second voltage is equal to or lower than the second preset voltage (1.2 V), the voltage fall monitor 70 outputs the reset signal (Res) to the microcomputer 50. Thereby, the microcomputer 50 is reset (i.e., is rebooted).

Further, in the present embodiment, other than a start time of the engine 10, the voltage of the battery 13 may fall for some unknown reasons, and the reference voltage at the time of the A/D conversion may fall from the normal value. Even in such a case, the motor 20 is controllable with high accuracy by correcting the input voltage A/D conversion value.

One embodiment of the present disclosure is summarized as follows.

That is, (1) the EPS-ECU 1 in the present embodiment is a control device which controls the motor 20, and is provided with the first regulator 41, the second regulator 42, and the microcomputer 50.

The first regulator 41 converts the external power source voltage which is a voltage from the battery 13 to the first voltage which is the predetermined voltage lower than the external power source voltage, and outputs the converted voltage.

The second regulator 42 converts the external power source voltage to the second voltage which is the predetermined voltage lower than first voltage, and outputs the converted voltage.

The microcomputer 50 has the peripheral 51 and the core 52.

The peripheral 51 operates on the first voltage outputted from the first regulator 41, and receives the input voltage which is the voltage inputted from the outside, and also received the second voltage.

The core 52 operates on the second voltage outputted from the second regulator 42, and generates the control signal for controlling the motor 20.

The microcomputer 50 generates the control signal with the core 52, outputs the control signal to the motor 20 via the peripheral 51, for controlling the motor 20.

Further, the peripheral 51 has the A/D converter 512.

The A/D converter 512 performs the A/D conversion of the input voltage and the second voltage by using the first voltage as the reference voltage, and outputs, to the core 52, (i) the input voltage A/D conversion value which is the result value of the A/D conversion of the input voltage, and (ii) the second voltage A/D conversion value which is the result value of the A/D conversion of the second voltage.

The core 52 has the voltage fall determiner 521 and the corrector 522.

The voltage fall determiner 521 determines whether the reference voltage is lower than the normal value which is a value at the normal operation time based on the second voltage A/D conversion value from the A/D converter 512.

The corrector 522 calculates the correction coefficient based on the second voltage A/D conversion value from the A/D converter 512, and corrects the input voltage A/D conversion value outputted from the A/D converter 512 based on the correction coefficient.

Further, in the present embodiment, the core 52 generates the control signal based on the input voltage A/D conversion value from the A/D converter 512, when it is determined by the voltage fall determiner 521 that the reference voltage is not lower than the normal value.

On the other hand, the core 52 generates the control signal based on the correction result value which is calculated by correcting the input voltage A/D conversion value outputted from the A/D converter 512 by the corrector 522 when it is determined that the reference voltage is lower than the normal value by the voltage fall determiner 521.

Thus, when the reference voltage is not lower than the normal value, the control signal is generated based only on the result value of the A/D conversion of the input voltage, and the motor 20 is controlled by such control signal in the present embodiment.

In such case, since the A/D converter 512 uses, as the reference voltage, the first voltage higher than the second voltage and performs the A/D conversion, the S/N ratio is high, and the A/D conversion of the input voltage is performed with high accuracy. Therefore, the motor 20 is controllable with high accuracy.

On the other hand, when the reference voltage is lower than the normal value, the input voltage A/D conversion value which is the result value of the A/D conversion of the input voltage by the A/D converter 512 includes the error.

Therefore, when the reference voltage is lower than the normal value, the corrector 522 corrects the input voltage A/D conversion value, and the control signal is generated based on the correction result value which is the result value of correction by the corrector 522, and the motor 20 is controlled by such correction result value in the present embodiment.

Here, the corrector 522 calculates the correction coefficient based on the second voltage A/D conversion value, which is the result value of the A/D conversion of the second voltage by the A/D converter 512, and corrects the input voltage A/D conversion value based on the correction coefficient. The correction coefficient is changed according to the degree of the fall of the reference voltage from the normal value.

Therefore, the corrector 522 can correct the input voltage A/D conversion value according to the degree of fall of the reference voltage. Therefore, even when the reference voltage is lower than the normal value, the motor 20 is controlled with high accuracy.

Thus, in the present embodiment, the motor 20 is controllable with high accuracy irrespective of the fall of the reference voltage used for the A/D conversion.

In the present embodiment, the core 52 is operable by the second voltage (e.g., 1.2 V) that is lower than the first voltage (e.g., 5 V). Therefore, even when the voltage of the battery 13 falls, the operation of the core 52 is guaranteed unless the voltage falls down to or around the second voltage.

(2) Further, in the present embodiment, the second voltage A/D conversion value when the reference voltage is not lower than the normal value is designated as Vf, and the second voltage A/D conversion value at a time of determination by the voltage fall determiner 512 is designated as Vr, and a determination value calculated as a ratio Vf/Vr is designated as j, and a value between 0 and 1 is designated as $\alpha$ (i.e., $0 \leq \alpha < 1$), the voltage fall determiner 521 determines:

at the time of $j \geq 1-\alpha$, that the reference voltage is not lower than the normal value; and at the time of $j < 1-\alpha$, that the reference voltage is lower than the normal value.

Thus, the voltage fall determiner 521 can determine whether the reference voltage is lower than the normal value by a relatively simple operation/calculation. Therefore, a time for such determination is decreased.

Further, when $\alpha$ is set to be a value between 0 and 1, the blind sector having a range of $\alpha$ is set up for the determination.

Further, since the second voltage A/D conversion value Vf when the reference voltage is not lower than the normal value is calculable in advance, such a value may be memorized in the microcomputer 50 in advance.

(3) Further, in the present embodiment, when the correction coefficient is designated as k, by calculating the correction coefficient k as k=Vf/Vr and by multiplying the input voltage A/D conversion value by the correction coefficient k, the corrector 522 can correct the input voltage A/D conversion value, and can obtain the correction result value.

Thus, the corrector 522 can correct the input voltage A/D conversion value by the relatively simple operation/calculation. Therefore, a time for such correction is decreased. Further, since the correction coefficient k corresponds to the determination value j, an already-calculated determination value j can be utilized as the correction coefficient k.

(4) Further, in the present embodiment, the voltage fall monitor 70 is provided for monitoring the fall of the voltage, i.e., for determining whether the first voltage which is outputted from the first regulator 41 is equal to or lower than the first preset voltage, and for determining whether the second voltage outputted from the second regulator 42 is equal to or lower than the second preset voltage, respectively.

The voltage fall monitor 70 resets the microcomputer 50, when the first voltage outputted from the first regulator 41 or the second voltage outputted from the second regulator 42 is determined as being equal to or lower than the first preset voltage or being equal to or lower than the second preset voltage, respectively.

In the present embodiment, since the first preset voltage and the second preset voltage are set up as a relatively low voltage (i.e., the first preset voltage: 3.3 V, the second preset voltage: 1.2 V), the reset occasions of the microcomputer 50 is controlled as few times as possible.

(5) Further, in the present embodiment, the electric power steering device 99 is provided with the above-mentioned EPS-ECU 1 and the motor 20. The motor 20 is capable of outputting the assist torque for assisting the steering operation by the driver under control of the EPS-ECU 1.

The above-mentioned the EPS-ECU 1 can perform the control of the electric power steering device 99 with high accuracy, even when the reference voltage falls, since the motor 20 controllable with high accuracy irrespective of the fall of the reference voltage used for the A/D conversion.

(6) Further, in the present embodiment, the starter 16, which outputs the torque for starting the engine 10 is connected to the battery 13.

In the present embodiment, at the engine restart time after the idol stop, etc. the voltage from the battery 13 may fall due to the drive of the starter 16, thereby causing a fall of the reference voltage used for the A/D conversion.

However, the above-mentioned the EPS-ECU 1 is capable of controlling the motor 20 with high accuracy irrespective of the fall of the reference voltage used for the A/D conversion, thereby enabling a high accuracy control of the electric power steering device 99 even when the voltage of the battery 13 falls and the reference voltage falls by the drive of the starter 16.

Other Embodiments

In other embodiments of the present disclosure, a value of $\alpha$ set to 0.01 in the above for the determination of the voltage fall determiner may be changed to other values, as long as $\alpha$ is a value between 0 and 1 (i.e., $0 \leq \alpha < 1$).

In case that a value of $\alpha$ is set to zero, i.e., $\alpha=0$, the voltage fall determiner determines that the reference voltage is lower than the normal value even when the external power source voltage falls only slightly.

The corrector, correcting the input voltage A/D conversion value by utilizing the already-calculated determination value j (=Vf/Vr) as the correction coefficient k (=Vf/Vr) in the above, may be configured in other ways, i.e., may be not utilizing the already-calculated determination value j for the calculation of the correction coefficient k.

Further, the voltage fall determiner may be dispensed with in other embodiments of the present disclosure.

Further, the control device may be applicable to a vehicle other than an idle stop vehicle in other embodiments of the present disclosure.

Further, the starter may be not connected to the battery that serves as an external power source in other embodiments of the present disclosure.

Further, the winding wires in the motor, i.e., in the rotating electric machine, provided as in three phases (i.e., U/V/W phases) in the above may be provided as having other number of phases other than the three phases in other embodiments of the present disclosure.

Further, an example of applying the rotating electric machine to the column assist type electric power steering device in the above may be changed to an application of the rotating electric machine to other types of electric power steering device, such as a rack assist type, which assists the drive of the rack shaft by the rotating electric machine, for example.

Further, the rotating electric machine and the control device may be combined to have one body in other embodiments of the present disclosure, to realize a controller-integrated rotating electric machine.

Further, the rotating electric machine in the above may be applicable not only to the drive unit of the electric power steering device but also to an actuator for driving a drive wheel of a hybrid vehicle or of other devices disposed in a non-vehicular apparatus, for example.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as is within the scope of the present disclosure as defined by appended claims.

What is claimed is:

1. A motor controller for controlling a rotating electric machine comprising:
   a first regulator converting an external power source voltage of an external power source to a first voltage that is a preset voltage lower than the external power source voltage and outputting the first voltage;
   a second regulator converting the external power source voltage of the external power source to a second voltage that is a preset voltage lower than the first voltage and outputting the second voltage; and
   a microcomputer including a peripheral and a core for controlling the rotating electric machine by outputting a control signal to the rotating electric machine via the peripheral, the peripheral (a) operating on the first voltage from the first regulator and (b) receiving (i) an input voltage from the external power source and (ii) the second voltage, and the core (c) operating on the second voltage from the second regulator and (d) generating the control signal, wherein
   the peripheral includes: an Analog-to-Digital (A/D) converter that performs an A/D conversion for the input voltage and for the second voltage, with reference to the first voltage that serves as a reference voltage, and outputs an input voltage A/D conversion value that is a result value of A/D conversion of the input voltage, and a second voltage A/D conversion value that is a result value of A/D conversion of the second voltage,
   the core includes: a voltage fall determiner determining whether the reference voltage is lower than a normal reference value that is a value of the reference voltage at a normal operation time, based on the second voltage A/D conversion value; and a corrector calculating a correction coefficient based on the second voltage A/D conversion value, and correcting the input voltage A/D conversion value based on the correction coefficient,
   the control signal is generated based on the input voltage A/D conversion value, when the voltage fall determiner determines that the reference value is equal to or higher than the normal reference value, and
   the control signal is generated based on a correction result value that is calculated by correcting the input voltage A/D conversion value by the corrector, when the voltage fall determiner determines that the reference value is lower than the normal reference value.

2. The motor controller of claim 1, wherein
   the voltage fall determiner determines that the reference voltage is equal to or higher than the normal reference voltage, when $j \geq 1-\alpha$ is true, when designating
   i) as Vf, the second voltage A/D conversion value when the reference value is equal to or higher than the normal reference value,
   ii) as Vr, the second voltage A/D conversion value at a time of determination by the voltage fall determiner,
   iii) as j, a determination value that is calculated by dividing Vf by Vr, and
   iv) as $\alpha$, a preset value equal to or greater than 0 and less than 1,
and the voltage fall determiner determines that the reference voltage is lower than the normal reference voltage, when $j<1-\alpha$ is true.

3. The motor controller of claim 1, wherein
the corrector calculates the correction coefficient as k=Vf/Vr, designating,
i) as Vf, the second voltage A/D conversion value when the reference value is equal to or higher than the normal reference value,
ii) as Vr, the second voltage A/D conversion value at a time of determination by the voltage fall determiner,
iii) as k, the correction coefficient, and
the corrector calculates the correction result value by correcting the input voltage A/D conversion value, by multiplying the input voltage A/D conversion value by the correction coefficient k.

4. The motor controller of claim 1 further comprising:
a voltage fall monitor monitoring whether the first voltage output from the first regulator is equal to or less than a first preset voltage, or whether the second voltage output from the second regulator is equal to or less than a second preset voltage, wherein
the voltage fall determiner resets the microcomputer when the voltage fall determiner determines that the first voltage that is output from the first regulator is equal to or less than the first preset voltage or the second voltage that is output from the second regulator is equal to or less than the second preset voltage.

5. An electric power steering device comprising:
the motor controller of claim 1,
and
a rotating electric machine under control of the motor controller, the rotating electric machine configured to output an assist torque for assisting a steering operation by a driver.

6. The electric power steering device of claim 5, wherein
a starter is connected to the external power source, the starter outputting a torque that is used to start an internal combustion engine.

* * * * *